United States Patent [19]

Miyazaki

[11] Patent Number: 4,937,611
[45] Date of Patent: Jun. 26, 1990

[54] LIGHT METERING DEVICE

[75] Inventor: Takao Miyazaki, Tokyo, Japan

[73] Assignee: Fuji Photo Film Co., Ltd., Minami-Ashigara, Japan

[21] Appl. No.: 319,187

[22] Filed: Mar. 6, 1989

[30] Foreign Application Priority Data

Mar. 7, 1988 [JP] Japan .............................. 63-30068[U]

[51] Int. Cl.$^5$ ................................................ G03B 7/08
[52] U.S. Cl. .................................. 354/432; 250/208.6; 356/222
[58] Field of Search ................. 354/432, 431; 250/208, 250/214 P, 578, 211 R, 209; 356/222

[56] References Cited

U.S. PATENT DOCUMENTS

| | | | |
|---|---|---|---|
| 4,364,650 | 12/1982 | Terashita et al. | 354/432 |
| 4,629,304 | 12/1986 | Saegusa | 354/432 |
| 4,774,401 | 9/1988 | Yamada et al. | 354/432 |
| 4,796,043 | 1/1989 | Izumi et al. | 354/432 |

*Primary Examiner*—L. T. Hix
*Assistant Examiner*—David M. Gray

[57] ABSTRACT

A light metering device comprises a photometric element for independently metering a plurality of metering areas into which a whole image area is divided to provide weighted average brightness information for a scene to be photographed. The whole image area is divided into a plurality of metering areas including at least a center metering area defined at center of the whole image area, a lower metering area defined right below the center metering area, and two lower metering areas defined by a lower center half of the whole image area excluding the center metering area and the lower center metering area. The lower center metering area is weighted less than the center and lower metering areas by weighting differently the photometric sensitivities of the metering areas.

9 Claims, 3 Drawing Sheets

LIGHT METERING DEVICE

BACKGROUND OF THE INVENTION

The present invention relates to a light metering or photometric device used for metering a scene brightness for determining a proper exposure.

In recent photometric or light metering devices for metering the brightness of a scene to be photographed, an image plane is divided into a plurality of divisional areas, and the respective divisional areas are independently measured in brightness. Usually, such a light metering device generates outputs representing the brightness of the scene correspondingly to the divisional areas of the image plane. The outputs are separately weighted and are added together to provide integrated or collective brightness information based on which a proper exposure for the scene is determined.

For instance, in a center weighted metering system for emphasizing a lower area (which is hereinafter referred to as a lower area emphasizing center weighted metering system in this specification), in which the brightness of lower left and lower right areas surrounding the subject person is weighted secondly to the brightness of a principal or intended part of a subject, upper and lower light metering areas are formed in addition to and on both sides of a circular outlined light metering area defined at the center of an image plane, and these three light metering areas are differently weighted in photometric sensitivity in such a way that the center light metering area has the greatest photometric sensitivity and the upper light metering area has the smallest photometric sensitivity, among the three, respectively. When taking a picture of the general scene including a person or persons as a principal subject with the use of cameras equipped with such a lower area emphasizing center weighted metering device, the brightness of the face of the subject person is taken as of major factor of exposure determination, along with taking the brightness of areas surrounding the subject person in the lower area into account. In addition, the brightness of the upper area, which is generally affected by sun light, is treated lightly. Therefore, in major cases, a proper exposure can be given for the principal subject.

The above mentioned lower area emphasizing center weighted metering device, by metering the lower area independently from the center area for weighting differently the center, upper and lower metering areas is, however, accompanied with a problem that the brightness of clothes of a person as a principal subject will greatly affect the resultant brightness information obtained by the lower part emphasizing center weighted metering device. when taking a group picture, since the lower metering area which is weighted to some extent meters the light from the clothes of the persons, the faces of the persons will be different in density on a print even when they are uniformely lit.

OBJECTS OF THE INVENTION

It is, therefore, an object of the present invention to provide a light metering device in which weighted average brightness information can be provided based on which an exposure for a scene is determined.

It is another object of the present invention to provide a light metering device which can provide weighted average brightness information for a scene including a person or persons independently from the brightness of the clothes of the persons.

SUMMARY OF THE INVENTION

The above and other objects of the present invention can be accomplished by providing a center weighted metering device which comprises photometric means for independently metering a plurality of metering areas into which a whole image area is divided so as to provide a weighted average of brightness of the metering areas. The whole image area is divided into a plurality of metering areas including at least a center metering area defined at center of the whole image area, a lower metering area defined by a lower half of the whole image area excluding the center metering area, and a lower center metering area defined right below the center metering area by which the lower metering area is divided into into two. The lower center metering area is weighted less than the center and lower metering areas by weighting differently the photometric sensitivities of the metering areas.

When aiming the optical axis of a taking lens of a camera at the face of a person as a principal subject in the photographic scene, the lower center metering area, which is weighted less than the remaining metering areas, receives mostly light rays from clothes of the person. The center weighted metering device according to the present invention can therefore avoid an influence of the brightness of clothes of a person on the weighted average brightness information based on which an exposure is determined for a scene including the person as a principal subject to be photographed.

According to another preferred embodiment of the present invention, the center weighted light metering device further includes an outer center metering area surrounding the center metering area in the form of an annular ring. The measured values of the center and outer center metering areas are compared with each other to determine whether the lighting condition for a principal subject is ordinary or unusual. If the result of comparison indicates an unusual lighting condition like a backlighting or a spot-lighting, an exposure determined based on the weighted average brightness information obtained by the light metering device of the present invention can be properly corrected.

DETAILED DESCRIPTION OF THE INVENTION

Figure 1:
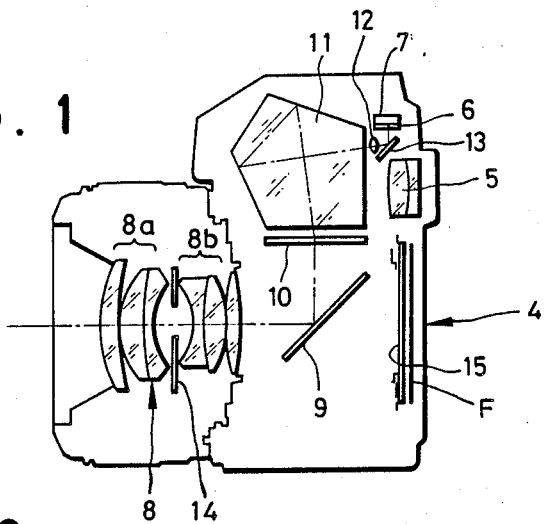
FIG. 1 is a schematic view illustrating a single lens reflex camera in which the present invention is embodied.

Referring now to FIG. 1, a single lens reflex type of automatic exposure (AE) camera 4 equipped with a light metering device according to the present invention is shown having a taking lens system 8 comprising two lens groups: front or first group 8a and rear or second group 8b. A diaphragm 14 is disposed between the first and second lens groups 8a and 8b. A quick return reflective mirror 9 is located behind the second lens group 8b. Above the quick return reflective mirror 9, a focusing screen 10 is fixedly mounted at substantially 45 degrees with respect to the quick return reflective mirror 9. An image focused on the focusing screen 10 is viewed through a finder system comprising a pentagonal prism 11 and an eye piece 5. A focal plane shutter 15 is disposed right before a film F and opens and closes to allow an image of a subject to be projected on the film when while the quick return mirror turns up.

Figure 2:
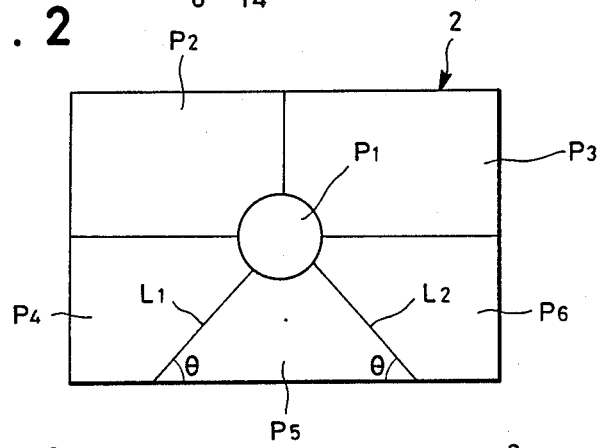
FIG. 2 is an illustration showing a pattern of metering areas of the light metering device according to a preferred embodiment of the present invention.

A photosensor 6 having a light receiving surface 2 shown in FIG. 2 is disposed above and forward of the eye piece 5 to receive a portion of light rays reflected by one inner surface of the pentagonal prism 11 and focused thereon by means of a focusing lens 12 and a fixed reflective mirror 13. The photosensor 6 cooperates with an operation unit 7 which differently weights outputs from the photosensor 6 and provides collective or integrated information required to obtain exposure, as will be described in detail later.

Referring to FIG. 2 illustrating a whole light metering area 2, corresponding to an image plane, formed on a photosensor 6 of the light meter in accordance with the present invention, the whole light metering plane or area 2 is divided into six light metering subdivisions: center light metering area P1, upper left light metering area P2, upper right light metering area P3, lower left light metering area P4, lower center light metering area P5, lower right light metering area P6, all of which are photometrically independent from one another.

The center light metering area P1 is defined by a circle having center at the center of the image plane 2 and is used for metering the face of a subject person as a principal subject. The upper left and upper right light metering areas P2 and P3 form the upper half of the whole light metering area 2 and, in most cases, are used to meter a far background of the principal subject or the sky. The lower left and lower right light metering areas P4 and P6, and the lower intermediate light metering areas P5 between the lower left and right light metering areas P4 and P6 form the lower half of the whole light metering area 2. The lower left and lower right light metering areas P4 and P6 are used to meter areas close to and surrounding the principal subject. The lower center light metering area P5 is formed right below the center light metering area P1 and is shaped substantially as an equilateral triangle, and is used to meter the lower part of the principal subject, such as the lower half of the subject person wearing clothes.

Figure 3:
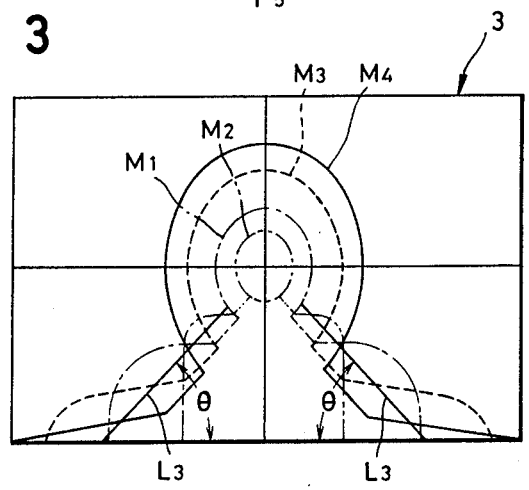
FIG. 3 is an illustration showing an image plane of the camera shown in FIG. 1.

Boundary lines L1 and L2 dividing the lower half of the whole light metering area 2 into the three lower light metering areas P4, P5 and P6 are inclined at an angle $\theta$ with respect to the base of the equilateral triangle-shaped, lower center light metering area P5. As illustrated in FIG. 2, the angle $\theta$ is determined so that the lower center light metering area P5 meters the clothes that the subject person, as a principal subject, wears independent from the subject distance when the center light metering area P1 is directed at the face of the person. That is, although images of the subject person, for instance, illustrated by M1, M2, M3 and M4 FIG. 3, different in size depending upon subject distances are projected on the image plane 3, a lower center area of the image plane defined by boundary lines L3 contains the major part of the body of the subject person therein so far as the center area of the image plane 3 is directed at the face of the subject person.

The operation unit 7 fetches the individual outputs p1 through p6 of the light metering areas P1 through P6 of the photosensor 6, and produces a weighted average S as collective brightness information by the use of the following formula:

$$S = 1/11 \times [4 \times p1 + 1 \times (p2 + p3) + 1 \times p5 + 2 \times (p4 + p6)]$$

The weighted average S is sent to an exposure controller (which is well known in the art and therefore need not be described in detail herein) for controlling the diaphragm 14 and the shutter 15 to automatically perform an exposure.

When the quick return reflective mirror 9 is positioned down as shown in FIG. 1, the taking lens 8 projects light rays from a subject onto the focusing screen, and is adjusted to focus an image of the subject on the focusing screen 10 which can be viewed through the finder system. A portion of light rays from the image focused on the focusing screen 10 is directed to and focused on the photosensor 6 by means of the focusing lens 12 and the fixed reflective mirror 14. When directing the center area of the image plane of the finder system at the face of the subject person, the center light metering area P1 of the photosensor 6 meters the brightness of the face of the subject person.

When a shutter release button (not shown) is depressed half way while directing the center area of the image plane of the finder system at the face of the subject person, the operation unit 7 calculates the weighted average brightness S of the scene by the use of the above noted formula. The weighted average brightness S results from the lower area emphasizing center weighted metering device in which the brightness of lower left and lower right areas surrounding the subject person is weighted secondly to the brightness of the face of the subject person, and the brightness of clothes of the subject person included in the lower center metering area P5 is intentionally weighted at one eleventh (1/11) of the actual or virtual brightness, as is the background included in the upper left and upper right metering areas P2 and P3. Therefore, the weighted average brightness S resulting from the lower area emphasizing center weighted metering device is virtually independent from the clothes of the subject person.

Fully depressing the shutter button causes an exposure control means to calculate an exposure, namely the speed of shutter and the opening size of diaphragm, proper for the scene based on the weighted average brightness. Immediately after the exposure calculation, the shutter 14 operates at the calculated shutter speed while the diaphragm 15 is maintained open to the calculated opening size so as to form an image of the scene including the subject person on the film F. In this exposure, the face of the subject person is most properly exposed.

It is preferable to hold the weighted average brightness S even if the face of the subject person moves out of the center area of the image field 3, as long as the shutter button is maintained depressed half-way.

Figure 4:
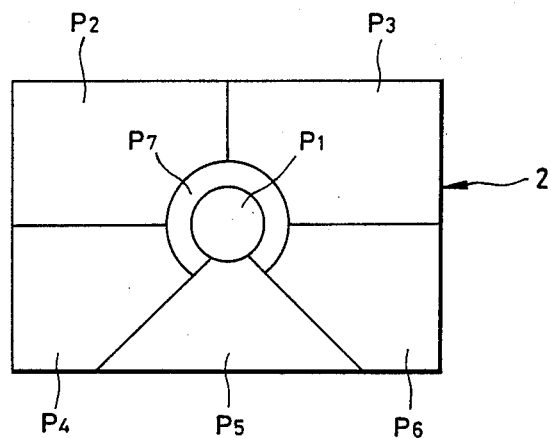
FIGS. 4 through 9 are illustrations, similar to FIG. 2, showing various patterns of metering areas of the light metering device according to preferred embodiments of the present invention.

In order to embody the present invention, the light receiving surface of the photosensor can take various patterns of light metering areas other than the pattern shown in FIG. 2. In FIG. 4, there is shown a preferred pattern of light metering areas. As shown, the light receiving surface 2 of the photosensor has an outer center metering area P7 formed as an annular ring, in addition to the six metering areas P1 to P6 previously described with reference to FIG. 2. The output from the outer center metering area P7 is compared with that from the center metering area P1 to determine whether the lighting condition for the subject person is unusual, as in backlighting or spot-lighting, when the difference between the two outputs is more than predetermined or preselected value. The determination of lighting condition contributes to conducting an automatic backlight control exposure or an automatic spot-light control exposure.

Figure 5:
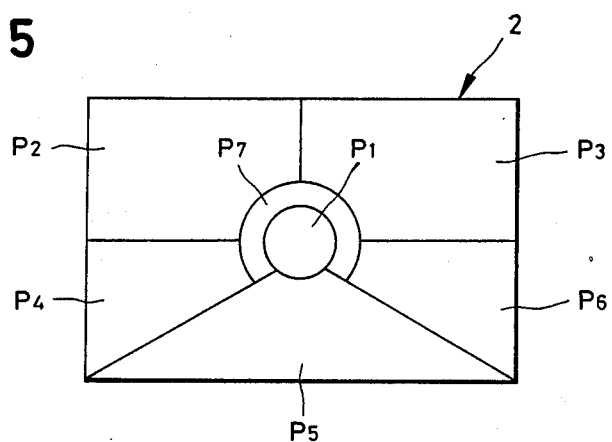

Referring to FIG. 5, another preferable pattern of light metering areas is shown, having the lower center metering area P5 expanded. As shown, the lower metering area P5 is defined by boundary lines which are lower halves of diagonal lines of the light receiving surface 2 of the photosensor 6. With the metering pattern shown in FIG. 5, the expanded lower center metering area P5 will be able to catch substantially all of the light rays from clothes of the subject person, and the brightness of the clothes is reduced to, for example, one eleventh of the actual brightness. This pattern of metering area contributes to close-up photography, such as a close-up of the face of the subject person.

Figure 6:
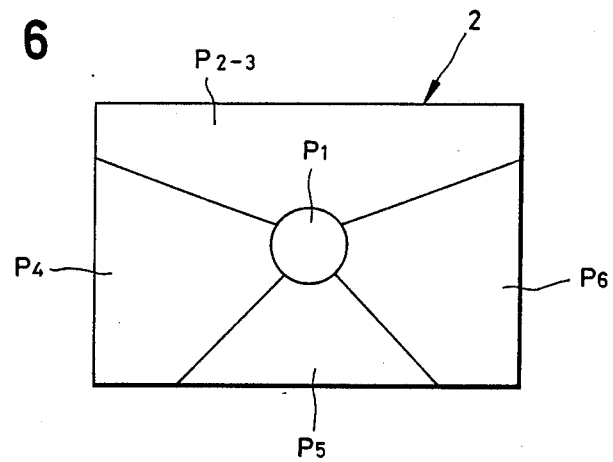
Figure 7:
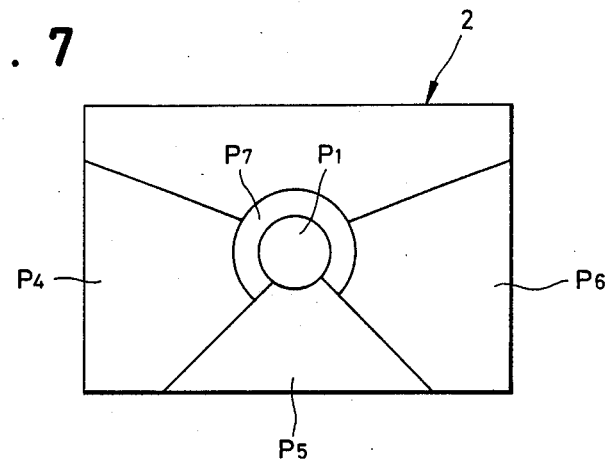

Referring to FIG. 6, still another preferable pattern of light metering area is shown, in which an upper metering areas P23 unites the upper left and upper right metering areas P2 and P3 shown in FIG. 2 and the lower left and lower right metering areas P4 and P6 are expanded. This pattern of metering area is advantageous for emphasizing areas surrounding a subject person's image or a principal subject image. As shown in FIG. 7, it is permissible to form an outer center metering area P7 on the pattern shown in FIG. 6 like that of the pattern in FIG. 4 or 5.

Figure 8:
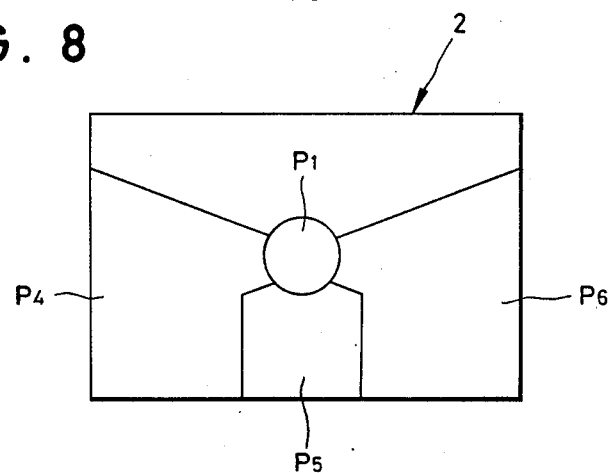
Figure 9:
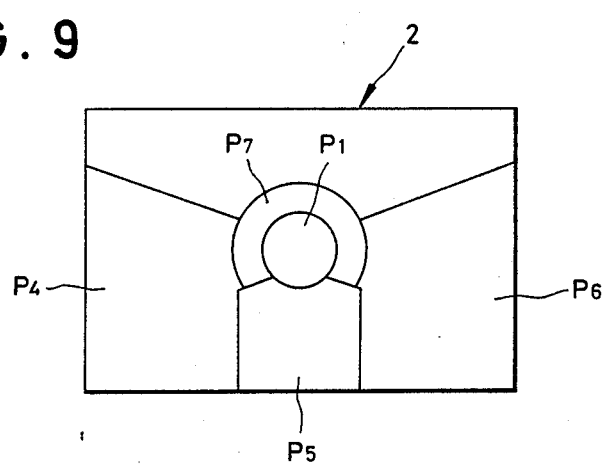

FIGS. 8 and 9 shows further preferable patterns of metering areas which are similar to those shown in FIGS. 6 and 7, respectively, but have a modified lower center metering area P5 reduced to outline a human body shape. When using these pattern of metering areas, the brightness for lower part of a scene can be more emphasized.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. In a center weighted light metering device for independently metering a plurality of metering areas into which a whole image area is divided to provide a weighted average of brightness of a scene included in the whole image area, the improvement comprising:

said plurality of metering areas including at least a center metering area defined at center of said whole image area, a lower center metering area defined right below said center metering area, and two lower metering areas defined by a lower half of said whole image area excluding said center metering area and said lower center metering area ; and said lower center metering area is weighted less than said center and lower metering areas.

2. A light metering device as defined in claim 1, wherein said metering areas are patterned on a light receiving surface of a photometric element.

3. A light metering device as defined in claim 2, wherein said metering areas are weighted by said patterned photometric element with different photometric sensitivities.

4. A light metering device as defined in claim 1, wherein said lower center metering area is formed substantially as an equilateral triangle.

5. A light metering device as defined in claim 1, wherein said lower center metering area is defined by lower halves of diagonal lines of said whole image area.

6. A light metering device as defined in claim 1, wherein the remaining upper half of said whole image area is divided into two upper metering areas.

7. A light metering device as defined in claim 1, wherein said plurality of metering areas further includes an outer center metering area formed in an annular ring surrounding said center metering area.

8. A light metering device as defined in claim 1, wherein said lower center metering area is formed to outline a human body.

9. A center weighted light metering device comprising:

a photoelectric conversion element for independently metering a plurality of metering areas of a whole image area consisting of a center metering area P1 defined at center of said whole image area, upper left and upper right metering areas P2 and P3, lower left and lower right metering areas P4 and P6 defined in a lower half of said whole image area excluding said center metering area, and a lower center metering area P5 defined right below said center metering area by which said lower metering area is separated, to provide a weighted average S of brightness of the whole image area, said plurality of metering areas are, respectively, weighted so as to provide said weighted average of brightness according to the following formula:

$S = 1/11 \times [4 \times p1 \times (p2+p3) + 1 \times p5 + 2 \times (p4+p6)]$ wherein p1, p2, p3, p4 and p5 are electric outputs from the photoelectric conversion element for the metering areas P1, P2, P3, P4 and P5, respectively.

* * * * *